United States Patent [19]

Miller

[11] Patent Number: 4,911,545

[45] Date of Patent: Mar. 27, 1990

[54] EXTENDIBLE AND PIVOTABLE MIRRORS FOR VEHICLES

[76] Inventor: George A. Miller, Rt. 2, Box. 491J, Lake Providence, La. 71254

[21] Appl. No.: 207,702

[22] Filed: Jun. 16, 1988

[51] Int. Cl.4 .......................... B60R 1/06; G02B 7/18; G02B 5/08

[52] U.S. Cl. ..................................... 350/604; 350/637

[58] Field of Search ................ 350/604, 637, 635, 632

[56] References Cited

U.S. PATENT DOCUMENTS

| | | | |
|---|---|---|---|
| 3,005,384 | 10/1961 | Baird et al. | 350/637 |
| 3,624,818 | 11/1971 | Stanfield | 350/637 |
| 3,820,1877 | 6/1974 | Moyer | 350/604 |
| 3,937,563 | 2/1976 | Frabe | 350/604 |
| 4,558,930 | 12/1985 | Deedreek | 350/604 |

FOREIGN PATENT DOCUMENTS

| | | | |
|---|---|---|---|
| 145041 | 11/1980 | Japan | 350/604 |
| 150850 | 7/1986 | Japan | 350/604 |
| 193948 | 8/1986 | Japan | 350/637 |

Primary Examiner—Jon W. Henry
Attorney, Agent, or Firm—John M. Harrison

[57] ABSTRACT

Extendible and pivotable mirrors for vehicles which include in a first preferred embodiment, an extendible mirror attached to a piston mounted in a fluid-operated cylinder secured in the door or fender panel of a vehicle. In a preferred embodiment, the extendible mirror is extended outwardly of the vehicle fender or door panel by operation of the cylinder and is manually pivotally adjusted for rear-view observation by the driver. The extendible mirror may be retracted in a mirror well located in the fender or door panel when not in use. In a second preferred embodiment of the invention, a pivoting mirror is first pivoted from a mirror well to a desired position by operation of a fluid-operated cylinder and is subsequently manually adjusted to a functional location for rear viewing from inside the vehicle. As in the case of the extendible mirror, the pivotable mirror can be pivoted into a mirror well located in the fender or door panel of the vehicle when not in use.

9 Claims, 2 Drawing Sheets

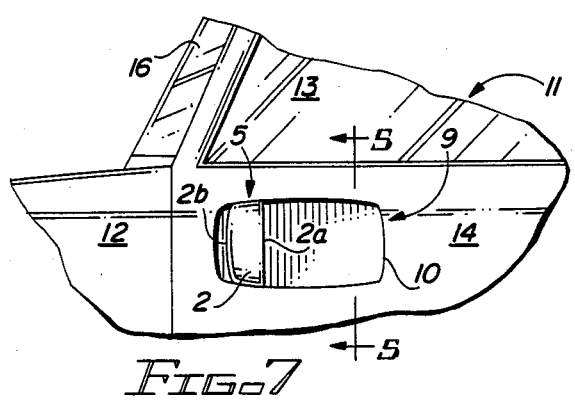
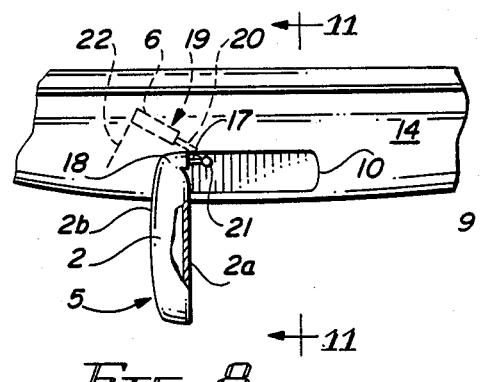
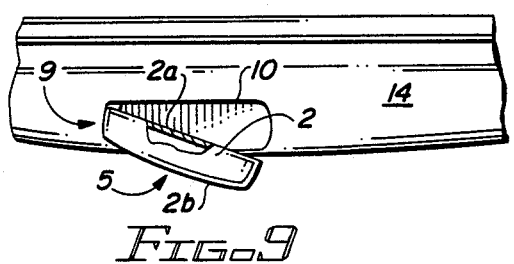
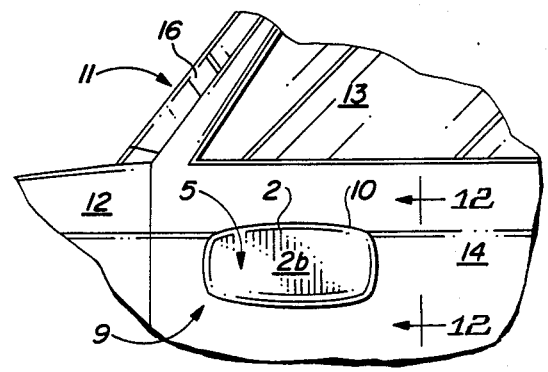
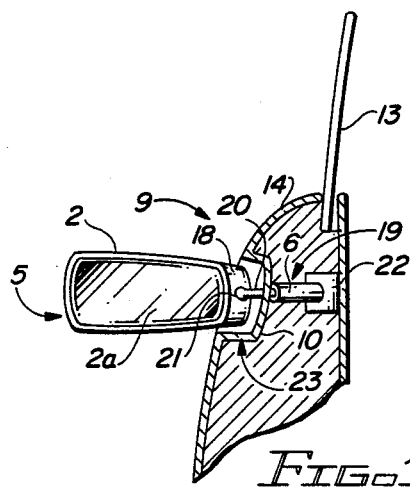
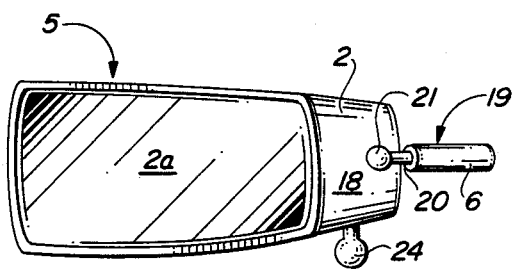
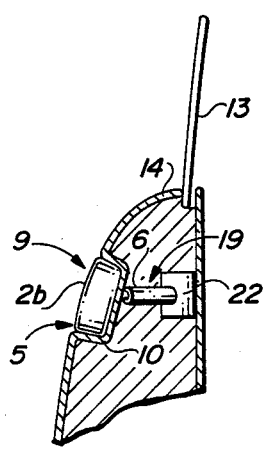
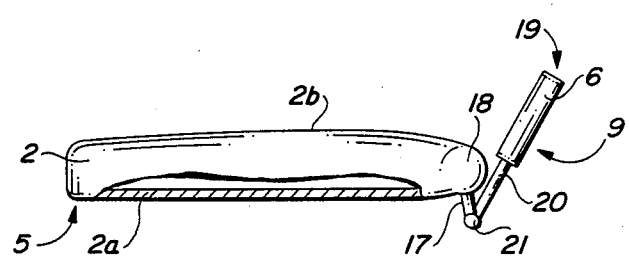

EXTENDIBLE AND PIVOTABLE MIRRORS FOR VEHICLES

BACKGROUND OF THE INVENTION

1. Field of the Invention

This invention relates to side-mounted rear view mirrors for vehicles and more particularly, to fender and door panel- mounted outside rear view mirrors which are selectively extendible and pivotable into functional viewing position from inside the vehicle and recessed into retracted configuration in mirror wells located in the fender or door panel of the vehicle.

Fender and door panel-mounted outside rear view mirrors are usually mounted on brackets fixedly secured to the door or fender of a vehicle for viewing by the driver of the vehicle while driving. These mirrors are commonly of the plane mirror design and are adjustably mounted on the bracket, in order to facilitate accurate rear vision, depending upon the position of the vehicle seat and the height of the driver. Accordingly, the mirror should be of sufficient size to obtain a sight or viewing area which is sufficiently large to view traffic to the rear of the vehicle and the mirror is normally mounted in a mirror housing which is aerodynamically curved, in order to present minimum surface area to the air through which the vehicle is passing.

Rear view mirror assemblies are typically mounted on both the driver and passsenger doors of a vehicle and many assemblies are designed with shock-absorbing mechanisms to prevent detachment of the mirrors from the doors of the vehicle if the mirrors are struck by an external force. The rear view mirrors are usually pivotally-mounted to brackets which are fixed to the vehicle doors and may include a double-hinge construction, in order to minimize the shock of impact. These shock-absorbing features are sometimes disadvantageous, in that the number of required component parts is large, thereby increasing the cost of manufacture. Furthermore, regardless of the various shock-absorbing features which may be incorporated into these outside mirrors, the mirrors project from the profile of the vehicle and are therefore frequently damaged due to collisions with other vehicles, contact with brushes and other mechanisms when the vehicle is pulled through a car wash apparatus and collision with structural members in parking garages and other small parking spaces.

U.S. Pat. No. 3,377,880, dated April 16, 1968, to Belton Carter, Jr., details a "Retractable Mirror for Motor Vehicles". The retractable mirror is mounted on the outside of the curb side of a bus and includes a mounting element normally holding the mirror in a position to provide a rear view and a retracting element for retracting the mirror when the bus approaches a curb, to prevent the mirror from striking a pole or other obstruction. U.S. Pat. No. 3,820,877, dated June 28, 1974, to James E. Moyer, discloses "Extendible and Retractable Motor Vehicle Mirror Arms". The motor vehicle mirror arms detailed in this patent can be extended or retracted from the dashboard of a vehicle to a point beyond the width of the motor vehicle, in order to enhance visibility to the rear. The mirror arms are moved by hydraulic, air, vacuum or electric means and can be positioned at any desired point from a fully retracted position to a fully extended configuration. A truck mirror which is adjustable in the horizontal direction is detailed in U.S. Pat. No. 4,558,930, dated Dec. 17, 1985, to Harold Deedreek. The mirror is adjustable by rotation or movement horizontally inwardly or outwardly from the truck by means of reversible motors which may be controlled from within the truck by the use of switches. The mechanisms for moving the mirror inwardly or outwardly include a rack and pinion arrangement which is controlled by a motor. U.S. Pat. No. 4,592,529, dated June 3, 1986, to M. Suzuki, details a "Shock Absorbing Mechanism for Rear View Mirror Assembly of Motor Vehicle". The shock-absorbing mechanism includes a mirror body which is movable in a horizontal direction with respect to a mounting stay secured to the motor vehicle in such a manner that the mirror body is initially located in the neutral standing position. The mirror body is movably supported for inclination when an external force is applied thereto and is automatically returned to the standing position upon removal of the external force. Alternatively, the mirror body may be inclined toward one side of the motor vehicle, as deemed necessary. U.S. Pat. No. 4,692,000, dated Sep. 8, 1987, to Y. W. Machida, details a "Motor-Driven Collapsible Door Mirror". A mirror housing for holding the collapsible door mirror is automatically swung and collapsed by remote operation in an automobile. The mirror housing is supported by a base and is swung around a fixed shaft and shifted to a predetermined position by a drive mechanism which includes a drive motor and a speed reducer mechanism.

It is an object of this invention to provide an extendible, side-mounted rear view mirror for a vehicle, which extendible mirror is characterized by a vehicle mirror assembly adjustably mounted on the piston of a fluid-operated cylinder, wherein the piston is designed to extend from retracted configuration in a mirror well in the fender or door of a vehicle and position the mirror in functional configuration for viewing traffic to the rear of the vehicle.

Another object of this invention is to provide a new and improved extendible mirror for a vehicle, which mirror is mounted on the piston of a fluid-operated cylinder, the piston being adapted for extension and retraction, in order to selectively position the mirror in extended configuration for viewing traffic to the rear of the vehicle by the driver and in recessed configuration in the fender or door of a vehicle to prevent mirror damage while the vehicle is parked, serviced or washed.

Yet another object of this invention is to provide a pivotable mirror for mounting on substantially any vehicle, which mirror is pivotally mounted in a mirror well located in the fender or door panel of the vehicle and is also pivotally attached to the piston of a fluid cylinder for extension from the mirror well to a functional position for viewing traffic to the rear of the vehicle.

Still another object of this invention is to provide a pivotable mirror for a vehicle, which pivotable mirror includes a mirror assembly pivotally mounted in a mirror well located in the fender or door panel of the vehicle and a fluid-operated cylinder having a cylinder housing mounted in the mirror well and the cylinder piston attached to the mirror assembly by means of a ball-joint, to facilitate pivoting of the mirror assembly into and out of the mirror well.

SUMMARY OF THE INVENTION

These and other objects of the invention are provided in extendible and pivotable, door or fender mounted rear view mirrors for vehicles, which mirrors are mounted on the pistons of fluid-operated cylinders adapted for extending and pivoting the mirrors respectively, such that the mirrors may be selectively positioned in extended configuration for viewing traffic to the rear of the vehicle and retracted into mirror wells in the fender or door panels of the vehicles when not in use.

BRIEF DESCRIPTION OF THE DRAWINGS

The invention will be better understood by reference to the accompanying drawings, wherein:

FIG. 7 is a side view of a pivoting mirror fully pivoted into extended configuration from the mirror well located in the door of a vehicle;

FIG. 8 is a top view of the pivoting mirror configuration illustrated in FIG. 7;

FIG. 9 is a top view of the pivoting mirror illustrated in FIGS. 7 and 8, with the mirror partially pivoted into the mirror well of the vehicle;

FIG. 10 is a side view of the pivoting mirror illustrated in FIG. 9, with the mirror fully pivoted into retracted, recessed configuration in the mirror well;

FIG. 11 is a sectional view taken along line 11—11 of the pivoting mirror illustrated in FIG. 8;

FIG. 12 is a sectional view taken along line 12—12 of the pivoting mirror illustrated in FIG. 10;

FIG. 13 is a perspective view of the pivoting mirror, cylinder and operating ball and socket joint of the pivoting mirror configuration illustrated in FIGS. 7–12; and FIG. 14 is a top view of the pivoting mirror, cylinder and operating ball and socket joint illustrated in FIG. 13.

DESCRIPTION OF THE PREFERRED EMBODIMENTS

Figure 1:
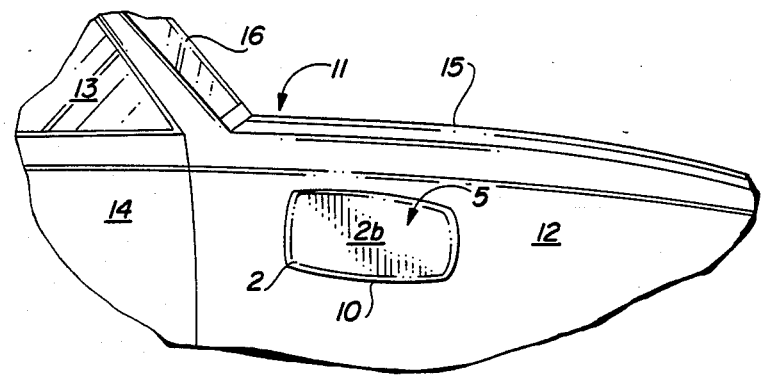
FIG. 1 is a side view of a preferred embodiment of an extendible mirror located in retracted and recessed configuration in the fender of a vehicle.
Figure 3:
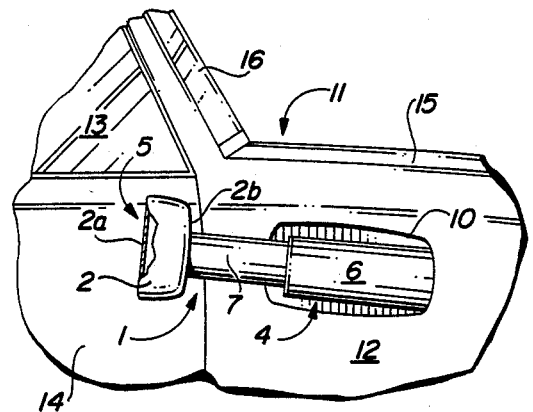
FIG. 3 is a side view of the extendible mirror illustrated in FIGS. 1 and 2 located in extended and adjusted configuration for viewing traffic to the rear of the vehicle.
Figure 2:
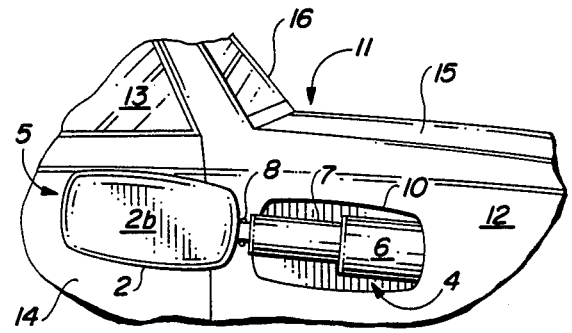
FIG. 2 is a side view of the extendible mirror illustrated in FIG. 1, positioned in extended configuration.
Figure 4:
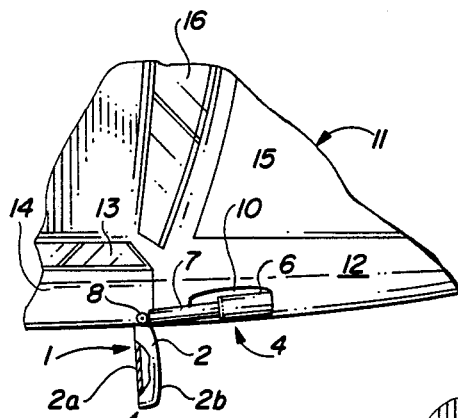
FIG. 4 is a top view of the extendible mirror configuration illustrated in FIG. 3.
Figure 5:
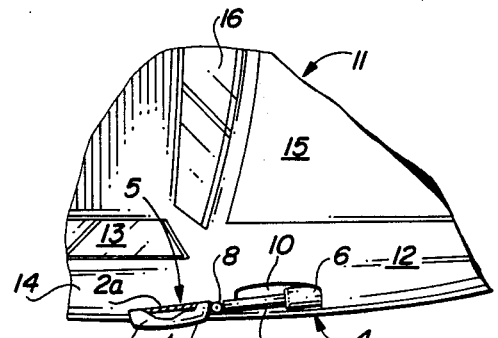
FIG. 5 is a top view of the extendible mirror configuration illustrated in FIG. 2.
Figure 6:
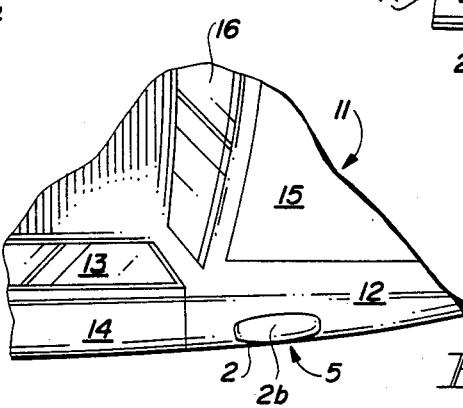
FIG. 6 is a top view of the extendible mirror configuration illustrated in FIG. 1.

Referring initially to FIGS. 1–3 of the drawings, an extendible mirror embodiment of this invention is generally illustrated by reference numeral 1 and includes a mirror assembly 5, which is designed for substantially flush mounting in the mirror well 10 of the front fender 12 in a vehicle 11. The vehicle 11 is conventional in design and features a hood 15 and windshield 16, as illustrated. As illustrated in FIG. 1, the mirror assembly 5 is recessed in the mirror well 10 with the rear surface 2b of the mirror frame 2 facing outwardly and substantially conforming to the contour of the front fender 12. Referring to FIG. 3, when it is desired to extend the extendible mirror 1 from the mirror well 10 as illustrated in FIG. 1, the extendible mirror cylinder 4 is activated from inside the vehicle 11 to extend the extendible mirror piston 7 from the cylinder housing 6. The mirror frame 2 is then manually pivoted on the piston ball and socket joint 8, which connects one end of the mirror frame 2 to the mirror piston 7, from the position illustrated in FIG. 2 to the functional viewing position illustrated in FIG. 3. Accordingly, the viewing surface 2a of the extendible mirror 1 can then be viewed through the side window 13 by a driver located inside the vehicle 11. As further illustrated in FIGS. 2 and 3, it will be appreciated that the base end of the cylinder housing 6 may be secured to the frame (not illustrated) of the vehicle inside the mirror well 10 in any desired manner, according to the knowledge of those skilled in the art, while the extendible mirror piston 7 extends outwardly of the mirror well 10 in angular relationship, in order to position the mirror frame 2 in the functional configuration illustrated in FIG. 3. The mirror frame 2 is universally adjustable on the piston ball and socket joint 8, in order to present a clear view of the traffic behind the vehicle 11 to the driver located inside the vehicle 11. Furthermore, the viewing surface 2a may also be adjustably mounted in the mirror frame 2, in order to further adjust the viewing surface 2a to suit the driver of the vehicle 11.

Referring now to FIGS. 7–12 of the drawings, in another preferred embodiment of the invention the mirror assembly 5 is configured to define a pivoting mirror 9. The mirror assembly 5 of the pivoting mirror 9 is pivotally mounted to the door panel 14 of a vehicle 11 by means of a mirror ball and socket joint 23, which includes a mirror ball 24, extending from the pivot end 18 of the mirror frame 2, as illustrated in FIGS. 11 and 13. As in the case of the extendible mirror 1, the mirror assembly 5 is designed to selectively seat in a mirror well 10, located in the door panel 14, when in non-viewing, folded configuration and pivot from the mirror well 10 to a viewing position, as illustrated in FIGS. 7, 8 and 11. This pivoting function is accomplished by means of a pivoting mirror cylinder 19, the cylinder housing 6 of which is mounted in fixed relationship to a mount plate 22, located in the mirror well 10 of the door panel 14, as illustrated in FIGS. 11 and 12. The pivoting mirror cylinder 19 is situated such that the pivoting cylinder piston 20 projects outwardly of the cylinder housing 6 into the mirror well 10 and is secured at the end thereof to an operating ball and socket joint 21, which is conventional in design. A pivot arm 17 is fixedly attached to the pivot end 18 of the mirror frame 2 and joins the operating ball and socket joint 21 to pivotally effect folding of the mirror assembly 5 into and out of the mirror well 10 about a vertical axis which projects through the mirror ball and socket joint 23. Accordingly, referring to FIGS. 7–10, the pivoting mirror 9 is pivoted from the retracted position illustrated in FIG. 10 to the extended position illustrated in FIGS. 7 and 8 by initially activating the pivoting mirror cylinder 19 from inside the vehicle 11 to extend the pivoting cylinder piston 20 from the cylinder housing 6 and pivot the mirror assembly 5 outwardly, as illustrated in FIG. 9. Continual movement of the pivoting cylinder piston 20 outwardly of the cylinder housing 6 extends the mirror assembly 5 to the position illustrated in FIGS. 7 and 8, such that the viewing surface 2a of the mirror frame 2 can be viewed through the side window 13 by the driver located inside the vehicle 11. Since the mirror frame 2 is universally adjustably mounted in the mirror well 10 by means of the mirror ball and socket joint 23, the mirror frame 2 can be adjusted inwardly and outwardly, as well as up and down to suit the driver. This adjustment is normally facilitated in an inward and outward direction by adjusting the pivoting cylinder piston 20 in the pivoting mirror cylinder 19. Upward and downward adjustment of the mirror frame 2 is facilitated by the universal action of the operating ball and socket joint 21. Additional adjustment of the viewing surface 2a within the mirror frame 2 is also possible under circumstances where the mirror assembly 5 is designed with the viewing surface 2a independently suspended, rather than fixedly mounted, inside the mirror frame 2.

It will be appreciated that both the extendible mirror cylinder 4 and the pivoting mirror cylinder 19 may be characterized by air or liquid-operated cylinders, according to the knowledge of those skilled in the art. Furthermore, a control system for effecting both extendible and pivotal operation of the extendible mirror 1 and the pivoting mirror 9 by extension and retraction of the extendible mirror piston 7 and the pivoting cylinder piston 20 is well within the skill of those who are knowledgeable in the art. Any such control system may be implemented to effect the extendible and pivotable mirror operation detailed herein.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. An extendible mirror for a vehicle comprising a mirror well provided in the vehicle; fluid-operated cylinder means mounted in said mirror well; a ball and socket joint provided in said fluid-operated cylinder means; and a mirror pivotally attached to said ball and socket joint of said fluid-operated cylinder means for adjusting said mirror with respect to said fluid-operated cylinder means and the vehicle, said mirror shaped for seating in said mirror well, whereby said mirror is selectively seated in said mirror well in retracted configuration and extendible from said mirror well in viewing configuration responsive to operation of said fluid-operated cylinder means.

2. The extendible mirror of claim 1 wherein said fluid-operated cylinder means further comprises a cylinder housing having one end secured to the vehicle inside said mirror well, with the opposite end of said cylinder housing facing said mirror well; a piston mounted in said cylinder housing in telescoping relationship; and said piston ball and socket joint joining said piston to said mirror, for adjusting said mirror with respect to the vehicle.

3. The extendible mirror of claim 1 wherein said mirror well is located in the fender of the vehicle.

4. The extendible mirror of claim 1 wherein said mirror well is locate din the door of the vehicle.

5. A pivoting mirror for a vehicle comprising a mirror well provided in the vehicle; fluid-operated cylinder means mounted in the mirror well; a mirror pivotally mounted on the vehicle in said mirror well, said mirror having a configuration substantially conforming to the configuration of said mirror well; an operating ball and socket joint provided in said fluid-operated cylinder means; and pivot arm means carried by said mirror, wherein said pivot arm means is pivotally attached to said fluid-operated cylinder means, and said pivot arm means is attached to said operating ball and socket joint for pivoting said morror to and from said mirror well, whereby said mirror is selectively pivoted into said mirror well and pivoted from said mirror well responsive to operation of said fluid-operated cylinder means.

6. The pivoting mirror of claim 5 wherein said fluid-operated cylinder means further comprises a cylinder housing having one end secured to the vehicle inside said mirror well, with the opposite end of said cylinder housing facing said mirror well; a piston mounted in said cylinder housing in telescoping relationship and wherein said pivot arm means is pivotally mounted to said piston.

7. The pivoting mirror of claim 5 wherein said fluid-operated cylinder means further comprises a cylinder housing having one end secured to the vehicle inside said mirror well, with the opposite end of said cylinder housing facing said mirror well; a piston mounted in said cylinder housing in telescoping relationship; and said operating ball and socket joint joining said pivot arm means to said piston, for pivoting said mirror to and form said mirror well.

8. The pivoting mirror of claim 7 wherein said mirror well is located in the fender of the vehicle.

9. The pivoting mirror of claim 7 wherein said mirror well is located in the door of the vehicle.

* * * * *